(12) United States Patent
Lee et al.

(10) Patent No.: US 10,855,361 B2
(45) Date of Patent: Dec. 1, 2020

(54) METHOD AND ELECTRONIC DEVICE FOR FORMING BEAM IN WIRELESS COMMUNICATION SYSTEM

(71) Applicant: Samsung Electronics Co., Ltd., Gyeonggi-do (KR)

(72) Inventors: Hyoungjoo Lee, Gyeonggi-do (KR); Taeyoon Kim, Gyeonggi-do (KR); Byungwook Yoo, Gyeonggi-do (KR); Chaeman Lim, Gyeonggi-do (KR); Euichang Jung, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/552,695

(22) Filed: Aug. 27, 2019

(65) Prior Publication Data
US 2020/0076493 A1    Mar. 5, 2020

(30) Foreign Application Priority Data
Aug. 31, 2018 (KR) ........................ 10-2018-0103969

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0617* (2013.01); *H04M 1/0202* (2013.01); *H04W 24/10* (2013.01); *H04M 2250/12* (2013.01)

(58) Field of Classification Search
CPC ...... H04B 7/0617; H04B 7/08; H04B 7/0802; H04B 7/0808; H04B 7/0814;
(Continued)

(56) References Cited

U.S. PATENT DOCUMENTS

| 7,248,217 B2 | 7/2007 | Mani et al. |
| 9,369,189 B2 | 6/2016 | Yu et al. |

(Continued)

FOREIGN PATENT DOCUMENTS

| WO | WO 2014/007519 | 1/2014 |
| WO | WO 2016/018121 | 2/2016 |

(Continued)

OTHER PUBLICATIONS

European Search Report dated Nov. 27, 2019 issued in counterpart application No. 19193986.7-1220, 9 pages.

(Continued)

*Primary Examiner* — Siu M Lee
(74) *Attorney, Agent, or Firm* — The Farrell Law Firm, P.C.

(57) ABSTRACT

An electronic device is provided and includes a housing, an antenna module, a wireless communication circuit, a processor, and a memory. The memory stores a number of measurements and a threshold. The number of measurements is defined for measuring, by using a directional beam, a strength of a plurality of beams having different directions and generated by at least one external electronic device. The threshold is defined for changing a beam pair link for communication with the external electronic device. The memory stores instructions that cause, when executed, the processor to measure, based on the number of measurements, a strength of a first beam generated by a first external electronic device by using a first directional beam formed in a first direction through the antenna module, to measure, based on the number of measurements, a strength of a second beam generated by at least one of the first external electronic device or a second external electronic device by using a second directional beam formed in a second direction different from the first direction through the antenna (Continued)

module, and to adjust at least one of the stored number of measurements or the stored threshold based on at least the measured strengths of the first and second beams.

20 Claims, 9 Drawing Sheets

(51) Int. Cl.
*H04W 24/10* (2009.01)
*H04M 1/02* (2006.01)
(58) Field of Classification Search
CPC .... H04B 7/0817; H04B 7/082; H04B 7/0822; H04B 7/0834; H04B 7/088; H04W 24/10; H04M 1/0202; H04M 2250/12
See application file for complete search history.

(56) References Cited

U.S. PATENT DOCUMENTS

| | | | | |
|---|---|---|---|---|
| 9,872,277 | B2* | 1/2018 | Park | H04W 72/02 |
| 2013/0170573 | A1 | 7/2013 | Jalloul et al. | |
| 2014/0004897 | A1 | 1/2014 | Jung et al. | |
| 2014/0198681 | A1* | 7/2014 | Jung | H04B 7/0617 370/252 |
| 2017/0207845 | A1* | 7/2017 | Moon | H04B 7/088 |
| 2017/0214444 | A1 | 7/2017 | Nigam et al. | |
| 2017/0215117 | A1* | 7/2017 | Kwon | H04B 7/04 |
| 2018/0049081 | A1 | 2/2018 | Tseng et al. | |
| 2018/0191422 | A1 | 7/2018 | Xia et al. | |
| 2018/0279151 | A1* | 9/2018 | Tseng | H04W 36/0083 |
| 2018/0317197 | A1* | 11/2018 | Kasher | H04W 16/28 |
| 2019/0230544 | A1* | 7/2019 | Zhu | H04W 24/10 |

FOREIGN PATENT DOCUMENTS

| | | |
|---|---|---|
| WO | WO 2018/028460 | 2/2018 |
| WO | WO 2018/126849 | 7/2018 |

OTHER PUBLICATIONS

International Search Report dated Dec. 2, 2019 issued in counterpart application No. PCT/KR2019/010594, 3 pages.

* cited by examiner

METHOD AND ELECTRONIC DEVICE FOR FORMING BEAM IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0103969, filed on Aug. 31, 2018, in the Korean Intellectual Property Office, the disclosure of which is incorporated herein by reference in its entirety.

BACKGROUND

1. Field

The disclosure relates generally to an electronic device and method for efficiently forming a beam in a wireless communication system.

2. Description of Related Art

In order to satisfy the increasing demands of radio data traffic after the commercialization of a fourth generation (4G) communication system, efforts have been made to develop an advanced fifth generation (5G) communication system or a pre-5G communication system. The 5G communication system or the pre-5G communication system is also referred to as a beyond-4G network system or a post-long term evolution (LTE) system. In order to accomplish a higher data transfer rate, the 5G communication system may provide a wireless communication service in a super-high frequency (also referred to as millimeter wave or mmWave) band (e.g., a 30~300 gigahertz (GHz) band). The 5G communication system may be also referred to as a next-generation mobile communication system.

The wireless communication in the super-high frequency band may cause a high directivity of the radio wave, so that a significant path loss of the radio wave may occur. Thus, in the super-high frequency band, the beamforming technique is often used to reduce the path loss of the radio wave and also increase a propagation distance of the radio wave. That is, electronic devices may perform wireless communication in the super-high frequency band based on the beamforming technique.

In the next-generation mobile communication system, an electronic device using the beamforming technique may determine a beam direction based on the strength of a signal received from a base station. For example, the base station may transmit signals at regular intervals (e.g., 5, 10, 20, or 40 ms), and the electronic device may measure the strength of the signals received from the base station. Then, based on the measured signal strength, the electronic device may determine a beam direction and form a beam pair link corresponding to the beam direction.

In searching for beams corresponding to a specific direction and measuring the beam strength, the electronic device may be limited by a time point of such a search or measurement. Thus, when performing wireless communication, the electronic device may have difficulty in forming an optimal beam pair link at a desired time point.

Thus, it may be advantageous to search for an optimal beam based on a current communication state of an electronic device and also form a beam pair link corresponding to the optimal beam. Accordingly, such an electronic device may be capable of efficiently forming a beam pair link in a high frequency band wireless communication system.

SUMMARY

The present disclosure has been made to address the above-mentioned problems and disadvantages, and to provide at least the advantages described below.

In accordance with an aspect of the present disclosure, an electronic device includes a housing, an antenna module disposed in the housing or forming a portion of the housing, and including a plurality of antenna elements, a wireless communication circuit electrically or operatively connected to the antenna module, and configured to form a directional beam by using the antenna module, a processor operatively connected to the wireless communication circuit, and a memory operatively connected to the processor, and configured to store a number of measurements and a threshold, the number of measurements being defined for measuring, by using the directional beam, a strength of a plurality of beams having different directions and generated by at least one external electronic device, and the threshold being defined for changing a beam pair link for communication with the external electronic device. The memory may store instructions that cause, when executed, the processor to measure, based on the number of measurements, a strength of a first beam generated by a first external electronic device by using a first directional beam formed in a first direction through the antenna module, to measure, based on the number of measurements, a strength of a second beam generated by at least one of the first external electronic device or a second external electronic device by using a second directional beam formed in a second direction different from the first direction through the antenna module, and to adjust at least one of the stored number of measurements or the stored threshold based on at least the measured strength of the first and second beams.

In accordance with another aspect of the present disclosure, a method for forming a beam pair link, performed by a processor of an electronic device, includes measuring a strength of a first beam generated by a first external electronic device by using a first directional beam formed in a first direction through an antenna module of the electronic device, measuring a strength of a second beam generated by at least one of the first external electronic device or a second external electronic device by using a second directional beam formed in a second direction different from the first direction through the antenna module, and adjusting at least one of a number of measurements or a threshold, based on at least the measured strengths of the first and second beams, the number of measurements being defined for measuring beam strength, and the threshold being defined for changing a beam pair link, wherein measuring the strengths of the first and second beams is performed based on the number of measurements.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
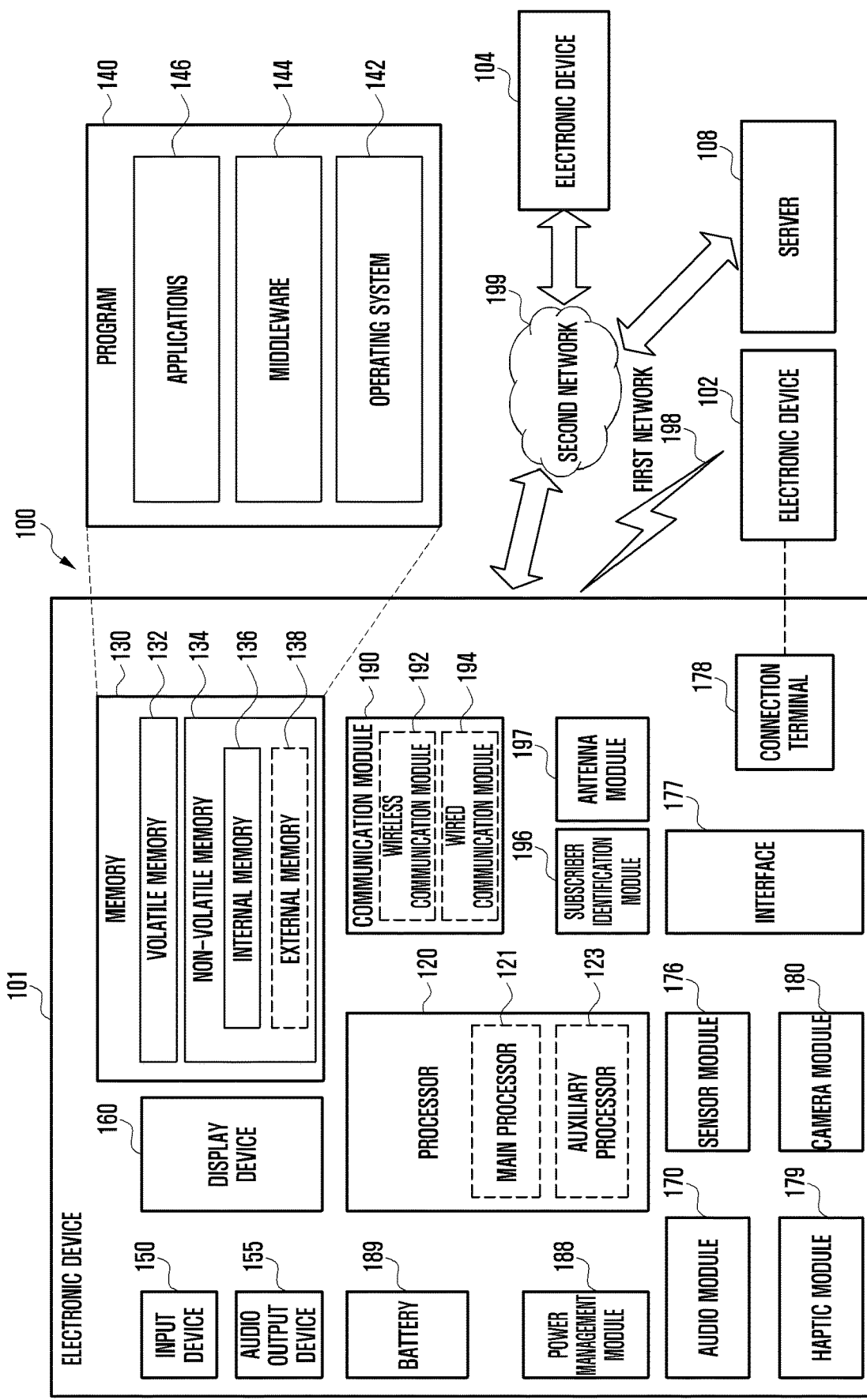
FIG. 1 is a block diagram illustrating an electronic device in a network environment, according to an embodiment.

Various embodiments of the disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

According to various embodiments of the present disclosure, it is possible to determine the optimal beam for wireless communication based on an identified communication state of an electronic device. In addition, the electronic device can determine the optimal beam in the current communication state and also form a beam pair link corresponding to the determined beam. Particularly, in wireless communication of a high frequency band, the electronic device can search for and determine the optimum beam and thereby efficiently perform wireless communication.

According to various embodiments of the present disclosure, the electronic device can provide the optimal wireless communication to a user and also improve the user's convenience in connecting to a wireless communication network in a next generation mobile communication system.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

According to an embodiment, the memory 130 may store instructions for operating at least one component of the electronic device 101. The memory 130 may store data on the number of beam measurements, data on a threshold, and mapping information between the data on the number of beam measurements and the data on a threshold. The memory 130 may store beam-related data in the form of a database (DB).

The program 140 may be stored in the memory 130 as software, and may include, for example, an operating system (OS) 142, middleware 144, or an application 146 (e.g., application program). According to an embodiment, the program 140 may include an application for determining an optimal beam corresponding to a current communication state through a beam search. For example, the optimal beam corresponding to the current communication state may be a beam having the maximum signal strength or a beam capable of transmitting/receiving data at the maximum transfer rate.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing a record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, based on the sensor module 176, the processor 120 may detect whether the electronic device 101 is held by the user. Based on the sensor module 176, the processor 120 may determine whether the user is gripping the electronic device 101 or keeping it in a pocket. The processor 120 may identify a particular function being performed by the electronic device 101 and determine, based on the identified function, whether to change a beam.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed of a conductor or a conductive pattern. In a certain embodiment, the antenna module 197 may further include any other component (e.g., RFIC) in addition to the conductor or conductive pattern. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. The antenna module 197 may form, at least in part, a portion of the housing of the electronic device 101 and may be an antenna array that includes a plurality of antenna elements. According to an embodiment, the antenna module 197 may emit a signal corresponding to a beam. According to an embodiment, the antenna module 197 may emit a signal in a specific direction, and the signal strength may be determined according to the signal emitting direction. The beam corresponding to a specific direction may be a directional beam. According to an embodiment, the processor 120 may enable the antenna module 197 to transmit and receive such a directional beam through the communication module 190. According to an embodiment, although not shown, the antenna module 197 may include at least one sensor such as a motion sensor and/or a grip sensor.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of the operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following description, a term for identifying an access node, terms for indicating network entities, terms for indicating messages, a term for indicating an interface between network entities, and terms for indicating various kinds of identification information are used for convenience of explanation. Therefore, the disclosure is not limited to the following terms, and other terms referring to equivalent objects having the same or similar technical meanings can be used alternatively.

For convenience of explanation, the disclosure will use terms and names defined in the 3rd Generation Partnership Project Long Term Evolution (3GPP LTE) standard. However, the disclosure is not limited by such terms and names, and the disclosure may be equally applied to any other system that conforms to any other standard.

Figure 2A:
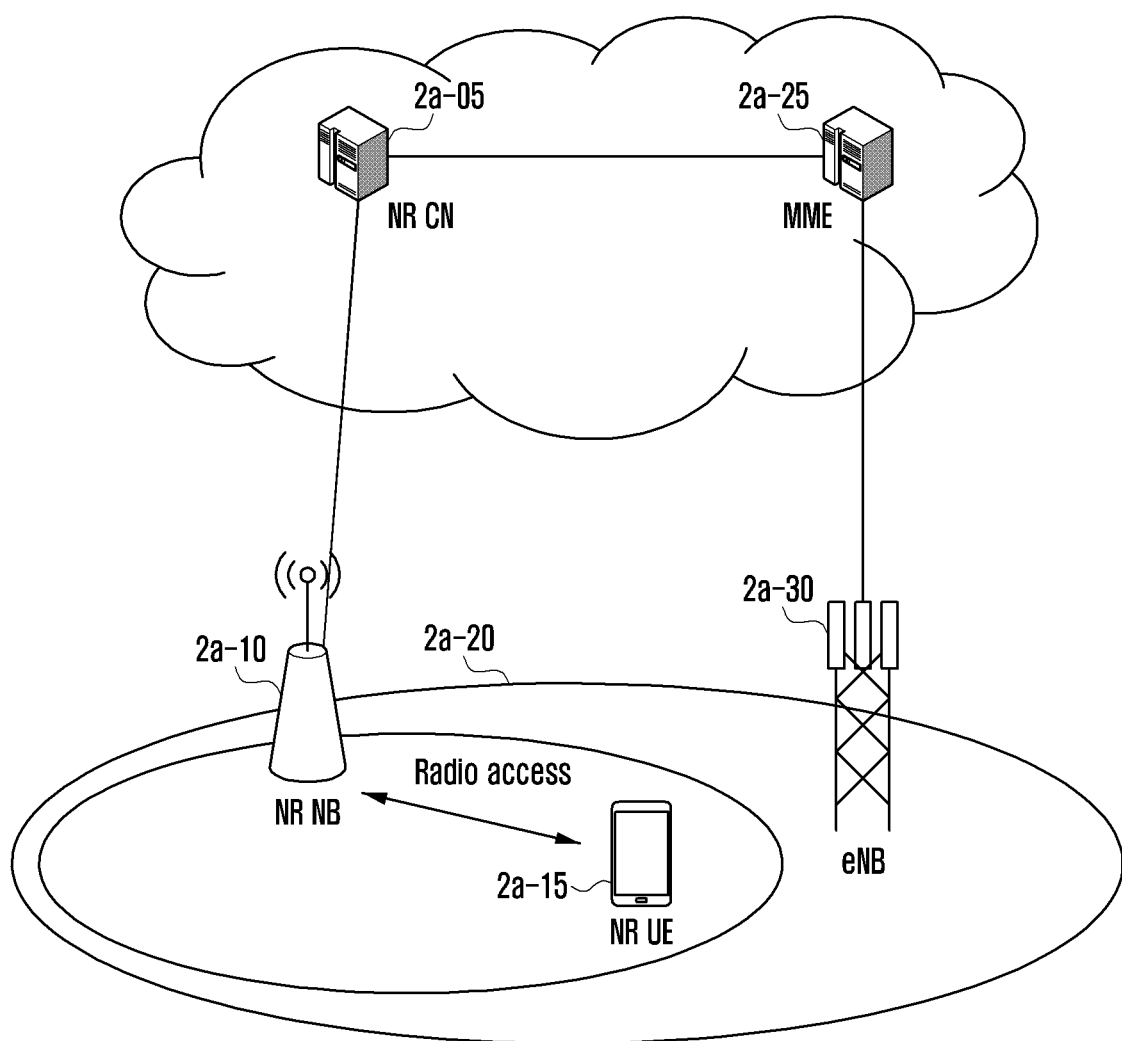
FIG. 2A is a diagram illustrating the architecture of a next generation mobile communication system, according to an embodiment.

FIG. 2A is a diagram illustrating the architecture of a next generation mobile communication system, according to an embodiment.

As shown in FIG. 2A, a radio access network of the next generation mobile communication system (e.g., a wireless communication system in a super-high frequency band) may include a next generation base station 2a-10 (also referred to as a new radio node B (NR NB)) and a new radio core network (NR CN) 2a-05. A user equipment (UE) 2a-15 (also referred to as a terminal) may access an external network through the NR NB 2a-10 and the NR CN 2a-05.

The UE 2a-15 shown in FIG. 2A may have, at least in part, the same configuration as that of the electronic device 101 shown in FIG. 1. For example, the UE 2a-15 may include the electronic device 101 in FIG. 1. The NR NB 2a-10 and the NR CN 2a-05 may belong to the second network 199 shown in FIG. 1.

In FIG. 2A, the NR NB 2a-10 may correspond to an evolved node B (eNB) of the LTE system. The NR NB 2a-10 may have radio access to the UE 2a-15 via a radio channel. In the next generation mobile communication system, all user traffic can be served through a shared channel. Thus, a device for collecting state information such as a buffer state of the UEs, an available transmission power state, and a channel state, may be required. Additionally, a device for performing scheduling may be required. This may be handled by the NR NB 2a-10. Normally, at least one NR NB 2a-10 is capable of controlling a plurality of cells. The UE 2a-15 may perform wireless communication with the NR NB 2a-10 based on a radio access technology according to orthogonal frequency division multiplexing (OFDM). The NR NB 2a-10 may provide wireless communication using the super-high frequency band. The NR CN 2a-05 may perform various functions such as mobility support, bearer setting, and quality of service (QoS) setting. The NR CN 2a-05 is a device for performing a mobility management function for the UEs 2a-15 and various control function, and may be connected to the NR NBs 2a-10. In addition, the next generation mobile communication system may be interworked with the existing LTE system. That is, the NR CN 2a-05 may be connected to an MME 2a-25 of the LTE system through a network interface. The MME 2a-25 may be connected to an eNB 2a-30 of the LTE system.

In order to increase a data transfer rate, the NR NB 2a-10 may transmit a signal by using a wide frequency band existing in a frequency band of 6 GHz or more. For example, an mmWave band, such as the 28 GHz band or the 60 GHz band, may be used. The super-high frequency band has a relatively great signal attenuation per unit of distance, so that transmission based on a directional beam generated using multiple antennas may be required to ensure coverage. The transmission based on the directional beam may be confronted with a difficulty in transmitting or receiving a signal at a position where no beam is formed. In order to overcome this problem, a technique called beam sweeping may be used. Beam sweeping is a technique whereby a transmitting device sequentially transmits, while rotating, the directional beam having a certain beam width so that the beam can arrive at receiving devices deployed within the beam coverage area of the transmitting device.

Figure 2B:
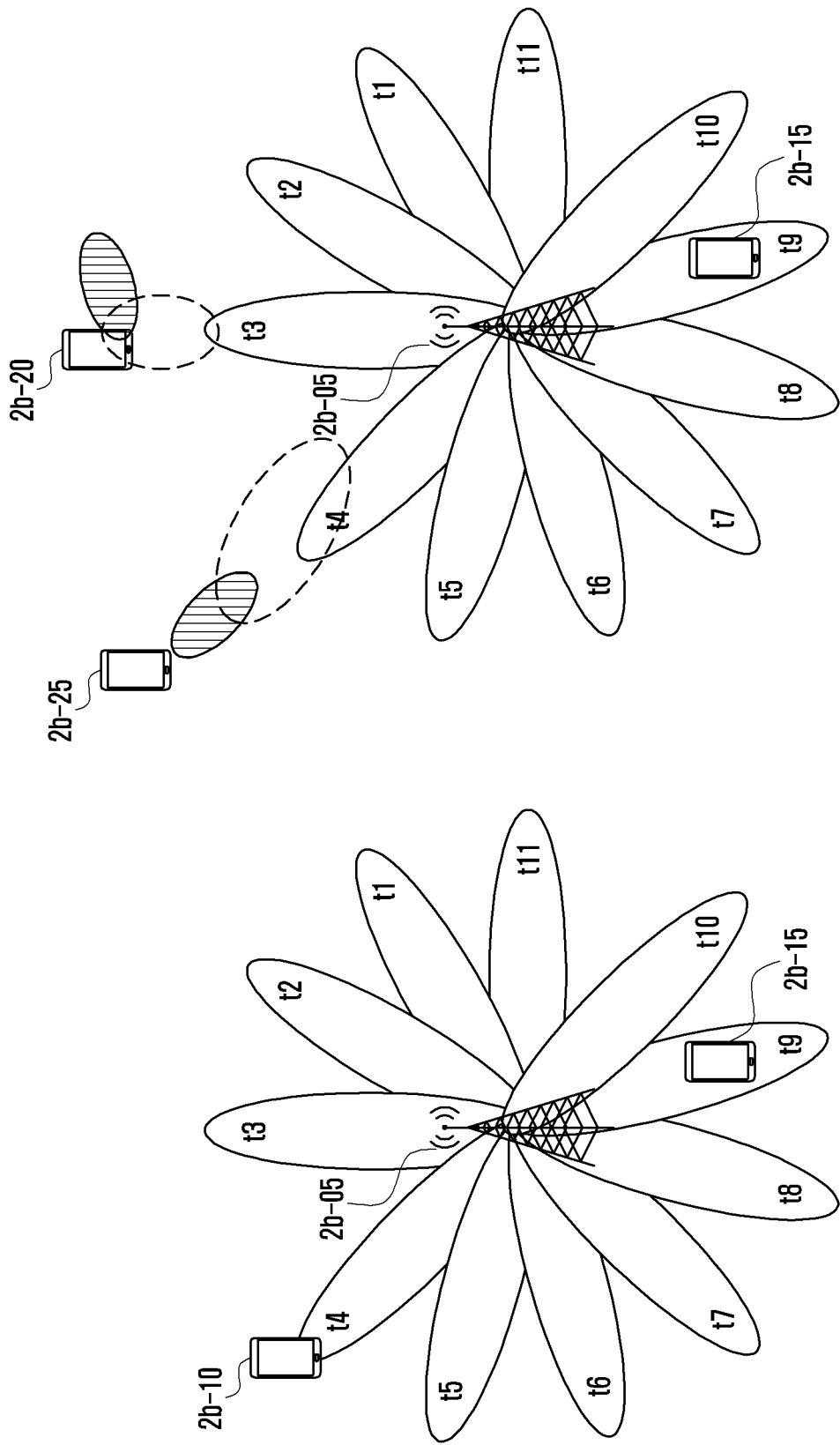
FIG. 2B is a diagram illustrating beam sweeping of a next generation mobile communication system, according to an embodiment.

FIG. 2B is a diagram illustrating a beam sweeping of a next generation mobile communication system according to an embodiment.

Referring to FIG. 2B, a transmission and reception point (TRP) 2b-05 transmits a directional beam having a predetermined width at a certain time (t1) in a certain direction and also transmits a directional beam having the same width at another time (t2) in another direction, so that the directional beams can be transmitted in all directions for a certain period of time. The TRP 2b-05 may include, for example, at least one of an NR NB 2a-10 or a device connected to the NR NB 2a-10 for transmitting and receiving a radio signal in a network. A downlink signal transmitted by the TRP 2b-05 may reach a certain UE 2b-10 at a certain time (t4) and also reach another UE 2b-15 at another time (t9). The TRP 2b-05 may transmit the directional beams in respective individual directions at regular time intervals. The TRP 2b-05 may transmit the directional beams in all directions (e.g., omnidirectional or non-directional) which are set or transmittable by the TRP 2b-05. Beam sweeping refers to the process in which the TRP 2b-05 sequentially transmits the directional beams in all directions.

Beam sweeping may be used when the TRP 2b-05 does not know the direction of the directional beam to be applied to the UEs 2b-10 and 2b-15. A common overhead signal to be provided to an idle UE may be transmitted via beam sweeping.

In order to increase the beam efficiency, a reception-directional beam (Rx beam) as well as a transmission-directional beam (Tx beam) may be used. When the Rx beam is used, the directivity/direction of the Tx beam and the directivity/direction of the Rx beam may be synchronized with each other. For example, even if a certain UE 2b-20 is located within the coverage of the Tx beam, the UE 2b-20 may fail to receive the Tx beam when the directivity of the Rx beam is not synchronized with the directivity of the Tx beam. Meanwhile, when the directivity of the Tx beam and the directivity of the Rx beam are synchronized with each other, a corresponding UE 2b-25 may transmit and receive data at a much higher efficiency in comparison with a case of not using an Rx beam.

In order to search for an Rx beam that is synchronized with the Tx beam, each of the UEs 2b-15, 2b-20, and 2b-25 may transmit Rx beams in different directions with respect to the same Tx beam. Then, based on such Rx beams transmitted in different directions, the UE can determine a particular Rx beam that provides the optimal reception quality (e.g., having the highest data transfer rate). For example, each of the UEs 2b-15, 2b-20, and 2b-25 may search for the optimal Rx beam through beam sweeping.

In the mobile communication system that uses a directional beam, an analog beam, or a hybrid beam, a common overhead signal may be transmitted through beam sweeping in a specific subframe, and a directional beam of a single direction may be used in another subframe so as to transmit and receive user data to and from a specific UE.

In the next generation mobile communication system, a base station (e.g., the NR NB 2a-10 in FIG. 2A) may transmit a reference signal (e.g., a signal system (SS) block, a channel state information reference signal (CSI-RS), a transmitting and receiving signal (TRS), and a phase tracking reference signal (PT-RS)), which performs a similar function to that of a cell-specific reference signal (CRS), at regular intervals (e.g., 5, 10, 20, 40, 80, or 160 ms). An electronic device (e.g., the UE 2a-15 in FIG. 2A) may measure, at such regular intervals, the signal strength by using a beam for measuring the signal strength. Then, based on the measured signal strength, the electronic device may select or change a beam.

In the next generation mobile communication system, a directional beam may be transmitted and received between a base station (e.g., the NR NB 2a-10 in FIG. 2A) and an electronic device (e.g., the UE 2a-15 in FIG. 2A). Forming a communication path between the base station and the electronic device on the basis of the directional beam is referred to as a beam pair.

The base station may transmit a directional beam to the electronic device, based on a downlink (DL) beam, and the electronic device may receive the directional beam based on the DL beam from the base station. The base station is capable of transmitting a beam to the electronic device based on DL communication.

Similarly, the electronic device may transmit a directional beam to the base station based on an uplink (UL) beam, and the base station may receive the directional beam based on the UL beam from the electronic device. The electronic device is capable of transmitting a beam to the base station based on UL communication.

A beam pair may refer to forming a transmission and reception path of a directional beam based on both DL communication and UL communication.

The electronic device may form, a communication link corresponding to at least one beam transmitted by the base station, and the base station may form a communication link corresponding to at least one beam transmitted by the electronic device. A communication link formed via beams between the electronic device and the base station may be referred to as a beam pair link. The electronic device and the base station may transmit or receive at least one of a control message or data, based on the beam pair link.

Figure 3:
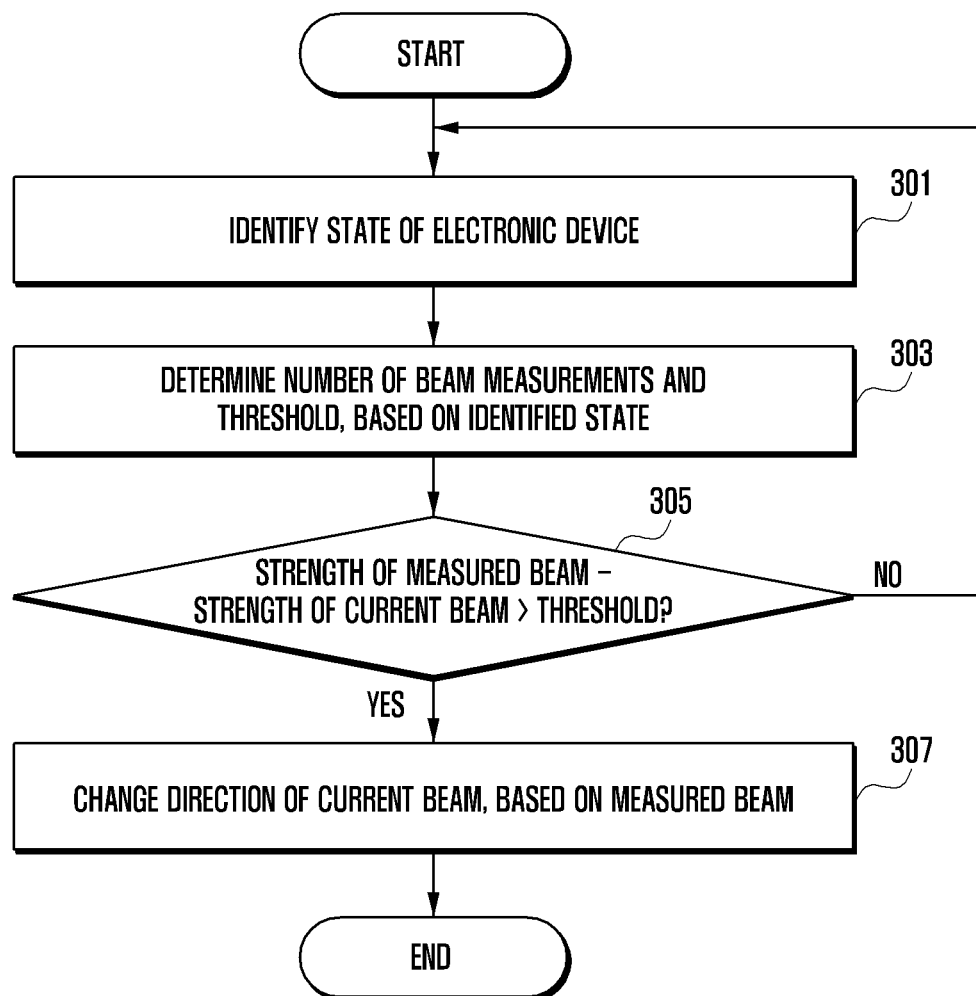
FIG. 3 is a flow diagram illustrating a method for determining whether to change a beam based on a communication state of an electronic device, according to an embodiment.

FIG. 3 is a flow diagram illustrating a method for determining whether to change a beam based on a communication state of an electronic device, according to an embodiment.

Referring to FIG. 3, at step 301, a processor 120 of an electronic device 101 identifies the state of the electronic device 101. For example, the electronic device 101 may be in a state of having formed a beam pair link with a base station (e.g., the NR NB 2a-10 in FIG. 2A) and also in a state of transmitting/receiving data (e.g., a signal), based on the beam pair link. When a signal is transmitted or received via the beam pair link, the strength of the signal may vary depending on the state of the electronic device 101 (e.g., a state where the electronic device 101 is moving, is gripped, or is held in a bag) and/or the state of a nearby object (e.g., a building or person). For example, when there is an obstacle on a transmission path (e.g., the beam pair link) of a beam-paired signal having a strong directivity, the strength of a received signal may be lowered. In addition, when the user is gripping the electronic device 101 or puts it in the bag, the strength of a received signal may be unstable or lowered.

The processor 120 may identify the state of the electronic device 101 based on the strength of a beam-paired signal and/or sensor information detected by a sensor module 176. The state of the electronic device 101 may be configured as a communication state and may include, but is not limited to, a stable communication state and an unstable communication state.

In the next generation mobile communication system, the signal strength may vary depending on the communication state of the electronic device 101 as shown in Table 1 below.

TABLE 1

|  | Best matched | | Mismatched | |
| --- | --- | --- | --- | --- |
|  | Rx0 | Rx1 | Rx0 | Rx1 |
| Average reference signal received power (average RSRP) | −64 | −66 | −80 | −80 |
| RSRP drop (dB) |  |  | 16 | 14 |

In Table 1, as shown above, the electronic device 101 may be in a stable communication state (also referred to as best matched) and may transmit and receive a signal having an average signal strength (e.g., average RSRP) of about −64 dB (Rx0) or −66 dB (Rx1). On the other hand, the electronic device 101 being in an unstable communication state (also referred to as mismatched) may transmit and receive a signal having an average signal strength of about −80 dB. That is, a difference between the signal strength in the stable communication state and the signal strength in the unstable communication state may be about 16 dB or 14 dB. The processor 120 may measure the strength of a signal corresponding to a current beam pair link. If the measured signal strength differs from the signal strength in the stable communication state by about 16 dB or 14 dB, the processor 120 may determine that the communication state of the electronic device 101 is unstable. Table 1 is merely provided as one example for the sake of explanation. Average signal strength values corresponding to the stable communication state and the unstable communication state may be changed based on the position and/or communication state of the electronic device 101.

At step 303, the processor 120 determines both the number of times of measurement (hereinafter, the number of measurements) and the threshold, for the beam search based on the identified state of the electronic device 101. For example, the processor 120 may determine the number of measurements and the threshold for the beam search, both corresponding to the communication state of the particular electronic device 101, and may store the determined data in a memory 130. The data may be stored in the form of a database (DB). In addition, the processor 120 may determine the number of measurements and/or the threshold for the beam search based on the identified state of the electronic device 101. When the state of the electronic device 101 is unchanged in terms of the received signal strength and when it is recognized through the sensor module 176 that there is no motion of the electronic device 101, the processor 120 may minimize the beam search. The threshold may be a difference value between the strength value of a first signal corresponding to the current beam pair link and the strength value of a second signal measured through the beam search. For example, if the strength value of the first signal corresponding to the current beam pair link is the optimized strength value, the threshold may be set to be high so as to maintain the current beam pair link. Alternatively, if the strength value of the first signal corresponding to the current beam pair link is low, the threshold may be set to be small so as to easily change to the second signal through the beam search.

The processor 120 may determine the priorities of a plurality of beams. For example, the processor 120 may determine the current beam pair link as the top priority. Alternatively, the processor 120 may determine the priorities of the remaining beams other than the beam forming the beam pair link. For example, the processor 120 may determine the priorities of beams that are likely to form the beam pair link except for the beam for which the current beam pair link is formed. This operation of determining the priorities may be performed before, after, or concurrently with step 303.

At step 305, the processor 120 compares the threshold with a difference between the strength of a beam corresponding to the current beam pair link (e.g., the strength of a beam corresponding to the first signal) and the strength of a beam measured through the beam search (e.g., the strength of a beam corresponding to the second signal). For example, when the difference is greater than the threshold, the processor 120 may determine a change of the current beam pair link. If the difference is smaller than the threshold, the processor 120 may maintain the current beam pair link.

At step 307, the processor 120 changes the current beam pair link based on the beam measured through the beam search (e.g., the beam corresponding to the second signal). That is, the processor 120 may change the current beam pair link to a new beam pair link based on the beam corresponding to the second signal.

The processor 120 may determine, after changing to a new beam pair link (e.g., corresponding to the second signal), the priorities of the remaining beams other than the new beam pair link. For example, except for the beam for which the new beam pair link is formed, the processor 120 may determine the priorities of other beams that are likely to form the beam pair link. This operation of determining the priorities may be performed before, after, or concurrently with step 307.

The processor 120 may measure the signal strength of a beam of the current beam pair link and also identify the current state of the electronic device 101. Then, based on the measured signal strength and the current state of the electronic device 101, the processor 120 may determine whether to change the current beam pair link. In the case of changing the beam pair link, the processor 120 may change the current beam pair link to a new beam pair link corresponding to the found beam.

The state of the electronic device 101 may vary from time to time, and the processor 120 may periodically check the state of the electronic device 101. For example, when the user grips the electronic device 101 and begins to move, the processor 120 may recognize that the state of the electronic device 101 has changed. The processor 120 may measure the signal strength of a beam of the beam pair link and, when the average value of the measured signal strength is reduced more than a certain threshold, determine that the state of the electronic device 101 has changed.

When recognizing that the state of the electronic device 102 has changed, the processor 120 may reset the priorities for measuring the signal strength of a beam. For example, when recognizing the changed state of the electronic device 102 through the sensor module 176, the processor 120 may set the priority of the beam corresponding to the change to be high. On the other hand, when failing to precisely recognizing the changed state of the electronic device 102, the processor 120 may determine the beam priorities by measuring the signal strength of beams according to a default order, or determine the beam priorities on the basis of the previously measured beam signal strength.

In order to measure the signal strength of beams, the processor 120 may use at least one of an SS block, a CSI-RS, a physical downlink control channel (PDCCH), or a physical downlink shared channel (PDSCH). For example, although the PDCCH and the PDSCH are signals associated with the operation of receiving data, they may also be used to measure the signal strength of beams as needed. Similarly, although the CSI-RS is a signal associated with the operation of reporting the measured signal strength of a beam of the beam pair link to the base station, it may also be used to measure the signal strength of beams as needed. In addition, the signal strength of beams may be measured based on other signals, such as the SS block, allocated to the time-frequency resource regions.

Figure 4:
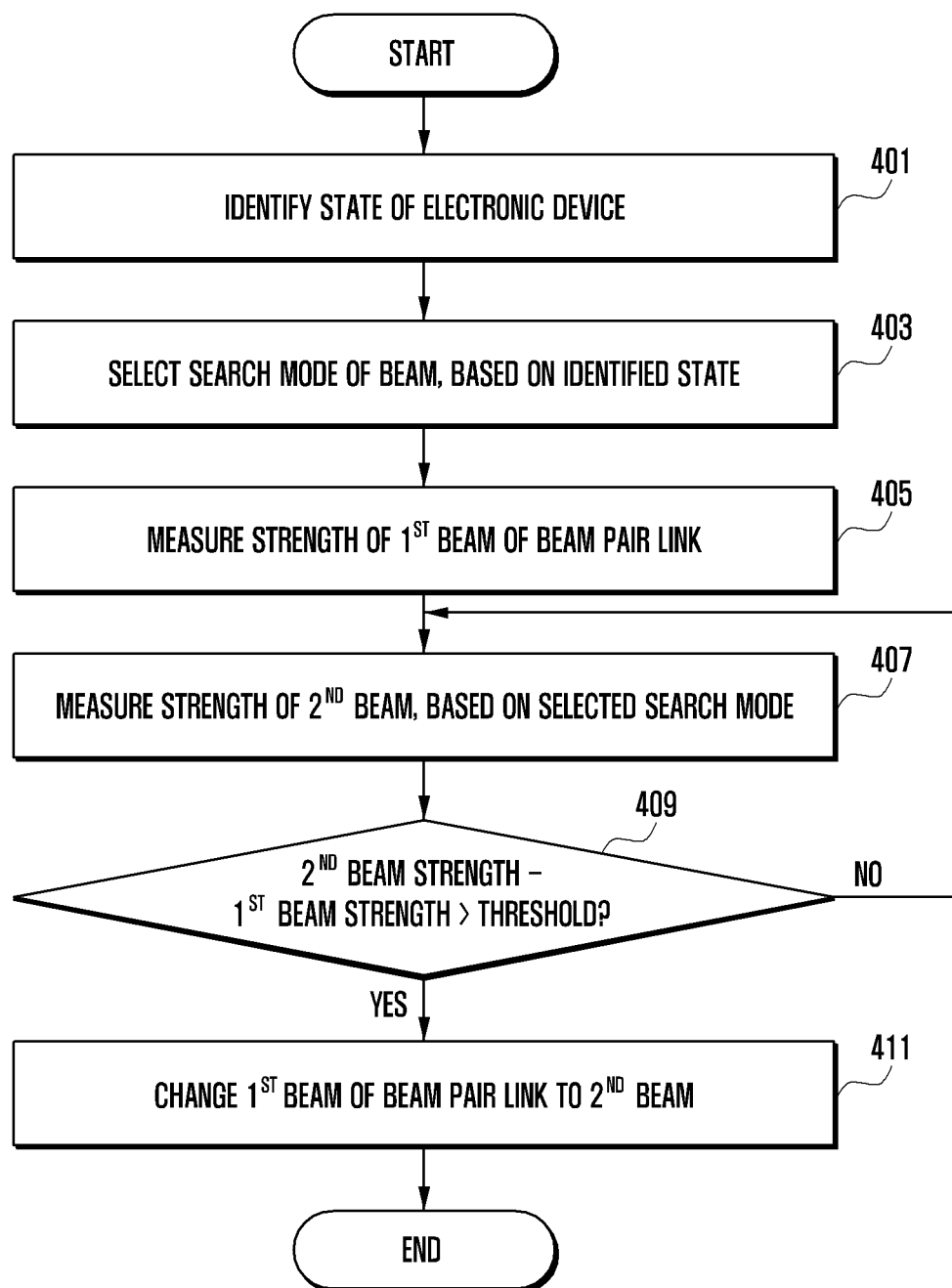
FIG. 4 is a flow diagram illustrating a method for determining whether to change a beam based on a communication state of an electronic device, according to an embodiment.

FIG. 4 is a flow diagram illustrating a method for determining whether to change a beam based on a communication state of an electronic device, according to an embodiment.

Referring to FIG. 4, at step 401, a processor 120 of an electronic device 101 identifies the state of the electronic device 101. For example, the electronic device 101 may be in a state of having formed a beam pair link with a base station (e.g., the NR NB 2a-10 in FIG. 2A) and also in a state of transmitting/receiving beam-based data based on the beam pair link. The processor 120 may identify the state of the electronic device 101 based on at least one of information about a signal based on the beam pair link and/or sensing information detected through a sensor module 176. For example, the processor 120 may check a communication state of the electronic device 101 and also check whether the electronic device 101 is located indoors, is located outdoors, is moving, or is fixed at a certain place. Also, the processor 120 may identify the position and state of the electronic device 101.

At step 403, the processor 120 selects a search mode for a beam of the beam pair link based on the identified state of the electronic device 101. For example, in the case of measuring the beam strength of the current beam pair link under a certain condition (e.g., when a request for measuring the beam strength of the beam pair link is received from the base station), the electronic device 101 may select a search mode based on the state thereof (e.g., located indoors, located outdoors, moving, or fixed at a certain place). For example, if the beam pair link is formed with the position of the electronic device 101 being fixed, the electronic device 101 may select a mode corresponding to a position-fixed state of the electronic device 101 from among a plurality of search modes stored in a memory 130.

As shown in Table 2 below, a search mode (e.g., the first mode or the second mode) corresponding to the state of the electronic device 101 (e.g., a position-fixed state or a state in which many obstacles exist in the periphery of the electronic device 101) may be selected. For example, the first mode may indicate a search mode in a state where the position of the electronic device 101 is fixed, and the second mode may indicate a search mode in a state where many obstacles are located around the electronic device 101. Further, based on congestion due to nearby obstacles, the second mode may be divided into high congestion and low congestion modes.

TABLE 2

| Search mode | Number of measurements | Threshold |
| --- | --- | --- |
| $1^{st}$ mode | $n_{avg}$ LOS | $Th_{avg}$ LOS |
| $2^{nd}$ mode (high congestion) | $n_{avg}$ H_high | $Th_{avg}$ H_high |
|  | $n_{ins}$ H_high | $Th_{ins}$ H_high |
| $2^{nd}$ mode (low congestion) | $n_{avg}$ L_high | $Th_{avg}$ L_high |
|  | $n_{ins}$ L_high | $Th_{ins}$ L_high |

Referring to Table 2, for each search mode, the number of measurements for searching for a beam and a threshold for determining whether to perform a change according to the found beam may be predefined. For the respective individual search modes, the number of measurements and the threshold may be stored in the memory 130. Although Table 2 shows the number of measurements and the threshold, this is only an example and not to be construed as a limitation. A measurement period for searching for a beam or the number of measurements within the measurement period. At step 403, the processor 120 selects a search mode and also determines, for the selected search mode, the number of measurements and the threshold.

With respect to the selected search mode, the number of measurements and the threshold may be determined for a beam search. The operation of selecting the search mode and the operation of determining the number of measurements and the threshold may be performed simultaneously or separately. For the selected search mode, the processor 120 may measure the strength of a beam generated from the base station (i.e., the external electronic device) and, based on the measured beam strength, adjust at least one of the number of measurements or the threshold value to perform a beam search.

The processor 120 may determine the number of times of measuring the beam strength with respect to each search mode. For example, for each search mode, the processor 120 may determine the number of measurements required to obtain a reliable measurement value of the beam strength. As shown in Table 2, the number of measurements and the threshold may be determined for each search mode, and information of Table 2 may be stored in the memory 130.

Referring to Table 2 above, for each state of the electronic device 101 (e.g., a position-fixed state (the first mode) or a state in which many obstacles exist in the periphery of the electronic device 101 (the second mode)), the number of times of measuring the beam strength may be determined. For example, when the electronic device 101 is in a fixed state, a change in signal strength may be small. Therefore, it is possible to obtain a reliable measurement value even in the case of a small number of measurements. On the other hand, when many obstacles are located around the electronic device 101, a change in signal strength may be large and occur often (i.e., a frequently changing signal strength). Thus, a large number of measurements are required to obtain a reliable measurement value. Referring to Table 2, the average number of times corresponding to the selected search mode may be predetermined, and the number of measurements may be determined based on the average number of times. Determining the number of measurements may mean determining the measurement period. The processor 120 may first determine the measurement period for measuring the beam strength and then, based on the determined measurement period, determine the number of measurements. The number of measurements for measuring the beam strength may be determined based on the average number of measurement times shown in Table 2.

The processor 120 may determine the number of measurements to measure the beam strength by adjusting a time interval (e.g., a reference signal measurement cycle) for measuring the beam strength. For example, the time interval for measuring the beam strength may be set differently for each base station or for each reception beam.

The processor 120 may determine the threshold corresponding to the selected search mode. For example, when the beam pair link is formed in a fixed state (e.g., the first mode in Table 2) of the electronic device 101, a change in signal strength is not large, and thus a low threshold may be set. On the other hand, when the electronic device 101 is in a state where many obstacles (e.g., people) are located in the periphery of the electronic device 101 (e.g., the second mode in Table 2), a change in signal strength is large, and therefore a high threshold value may be set. The threshold may be determined corresponding to a change in strength of a signal to be measured, and also determined for each search mode selected in the electronic device 101.

The processor 120 may set a plurality of thresholds (e.g., a first threshold and a second threshold). For example, when measuring the beam strength by the average number of times, the processor 120 may compare the average beam strength with the first threshold. On the other hand, when measuring the beam strength less than the average number of times, the processor 120 may compare the measured beam strength with the second threshold. The processor 120 may compare a predetermined threshold with a difference between the strength of a signal corresponding to a beam of the current beam pair link and the strength of a signal found through the beam search. Then, when the difference exceeds the threshold, the processor 120 may change the current beam pair link to a new beam pair link corresponding to the found signal.

At step 405, the processor 120 measures the strength of a first beam of the beam pair link. That is, the processor 120 may measure the strength of a signal for the first beam of the current beam pair link, based on the determined number of measurements (e.g., the measurement period). For example, the electronic device 101 may be in the beam pair link with the base station and may transmit the first beam to the base station for transmission and reception of signals. At step 405, the processor 120 measures the strength of a signal for the first beam.

At step 407, the processor 120 measures the strength of a second beam based on the search mode selected at step 403. For example, the processor 120 may search for the second beam based on the selected search mode, and may measure the strength of a signal for the second beam. Also, based on the number of measurements determined at step 403, the processor 120 may measure the strength of a signal for the second beam.

At step 409, the processor 120 compares a threshold with a difference between the strength of a signal for the second beam and the strength of a signal for the first beam. This threshold may be equal to the threshold determined at step 403. If the difference exceeds the threshold, the processor 120 changes, at step 411, the first beam of the current beam pair link to the second beam to form a new beam pair link.

Figure 5:
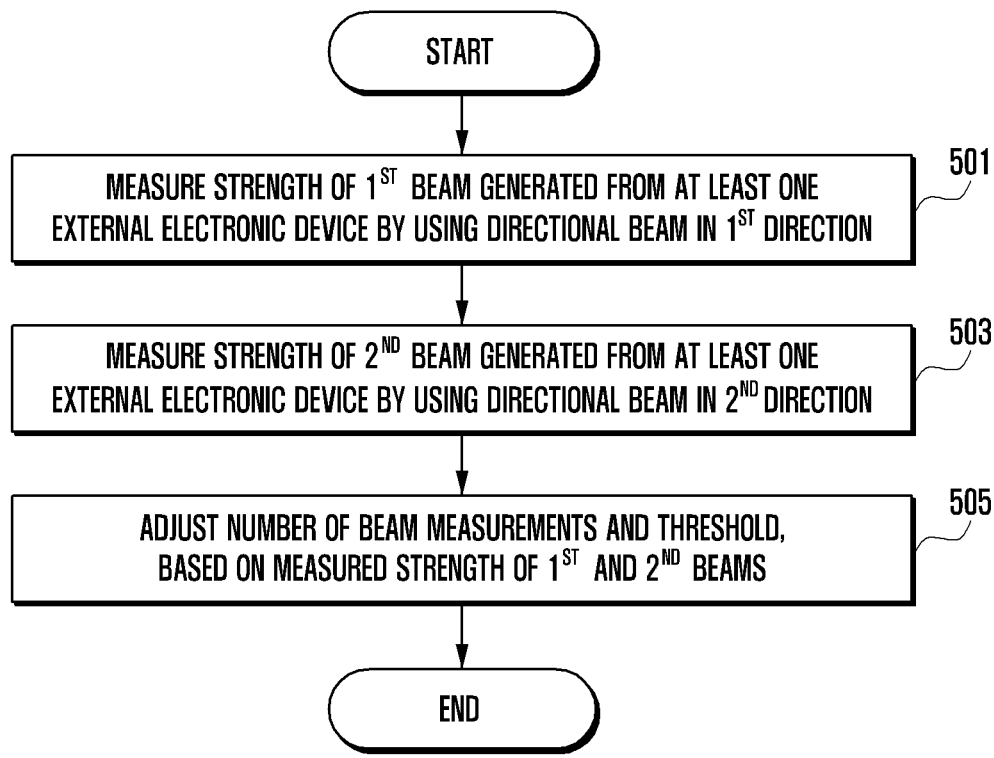
FIG. 5 is a flow diagram illustrating a method for adjusting the number of beam measurements and adjusting a threshold, according to an embodiment.

FIG. 5 is a flow diagram illustrating a method for adjusting the number of beam measurements and adjusting a threshold, according to an embodiment.

At step 501, a processor 120 of an electronic device 101 measures, by using a directional beam in the first direction, the strength of the first beam generated from at least one external electronic device (e.g., the first base station). The electronic device 101 may use a directional beam corresponding to at least one direction (e.g., the first direction), based on an antenna array module 197. Therefore, using the directional beam in the first direction, the processor 120 may measure the strength of the first beam generated from the first base station.

At step 503, the processor 120 measures, by using a directional beam in the second direction, the strength of the second beam generated from at least one external electronic device (e.g., the first base station or the second base station). The electronic device 101 may use a directional beam corresponding to the second direction different from the first direction based on the antenna array 197. Therefore, using the directional beam in the second direction, the processor 120 may measure the strength of the second beam generated from at least one of the first base station or the second base station.

At step 505, the processor 120 adjusts the number of beam measurements and the threshold based on the measured first beam strength and the measured second beam strength.

The processor 120 may detect the state of the electronic device 101 (e.g., a gripped state, a moving state, or a state of being held in a bag) by using at least one sensor included in the antenna module 197 and then, based on the detected result, adjust at least one of the number of beam measurements and the threshold. The at least one sensor may include at least one of a motion sensor or a grip sensor.

At the above-described step 501, the processor 120 measures a variation in the strength of the first beam corresponding to the directional beam in the first direction. Then, based on at least a result of a comparison between the measured variation and the first threshold, the processor 120 may determine the second beam corresponding to the directional beam in the second direction different from the first direction.

A memory 130 of the electronic device 101 may store the priorities of the first and second beams. When the variation in the first beam strength exceeds the first threshold, the processor 120 may adjust the priorities of the first and second beams. On the other hand, when the variation amount of the first beam strength is equal to or smaller than the first threshold, the processor 120 may maintain the beam pair link for the first beam.

Figure 6A:
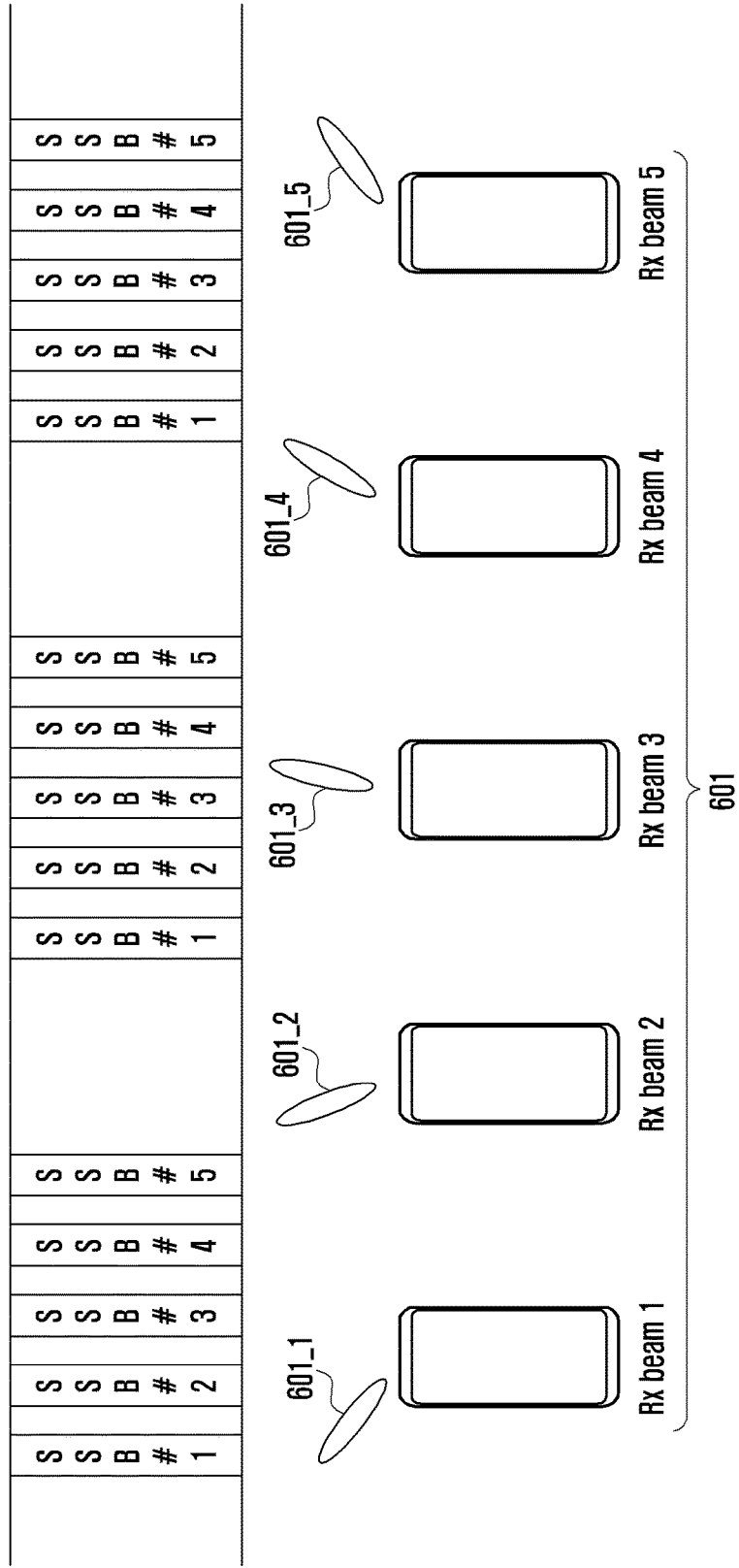
FIG. 6A is a diagram illustrating a method for reducing the number of beam searches in a beam sweeping process, according to an embodiment.
Figure 6B:
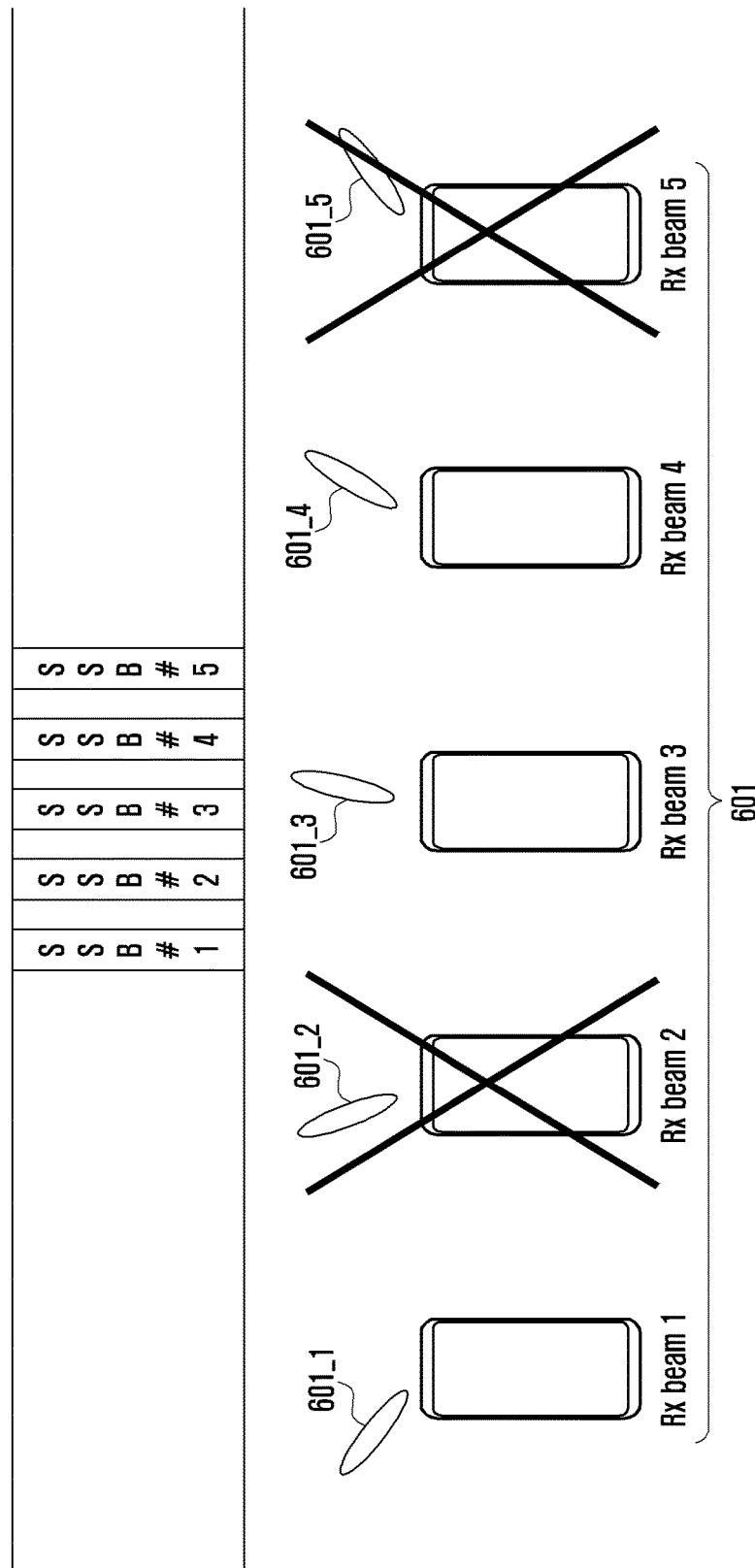
FIG. 6B is a diagram illustrating a method for reducing the number of beam searches in a beam sweeping process, according to an embodiment.
Figure 6C:
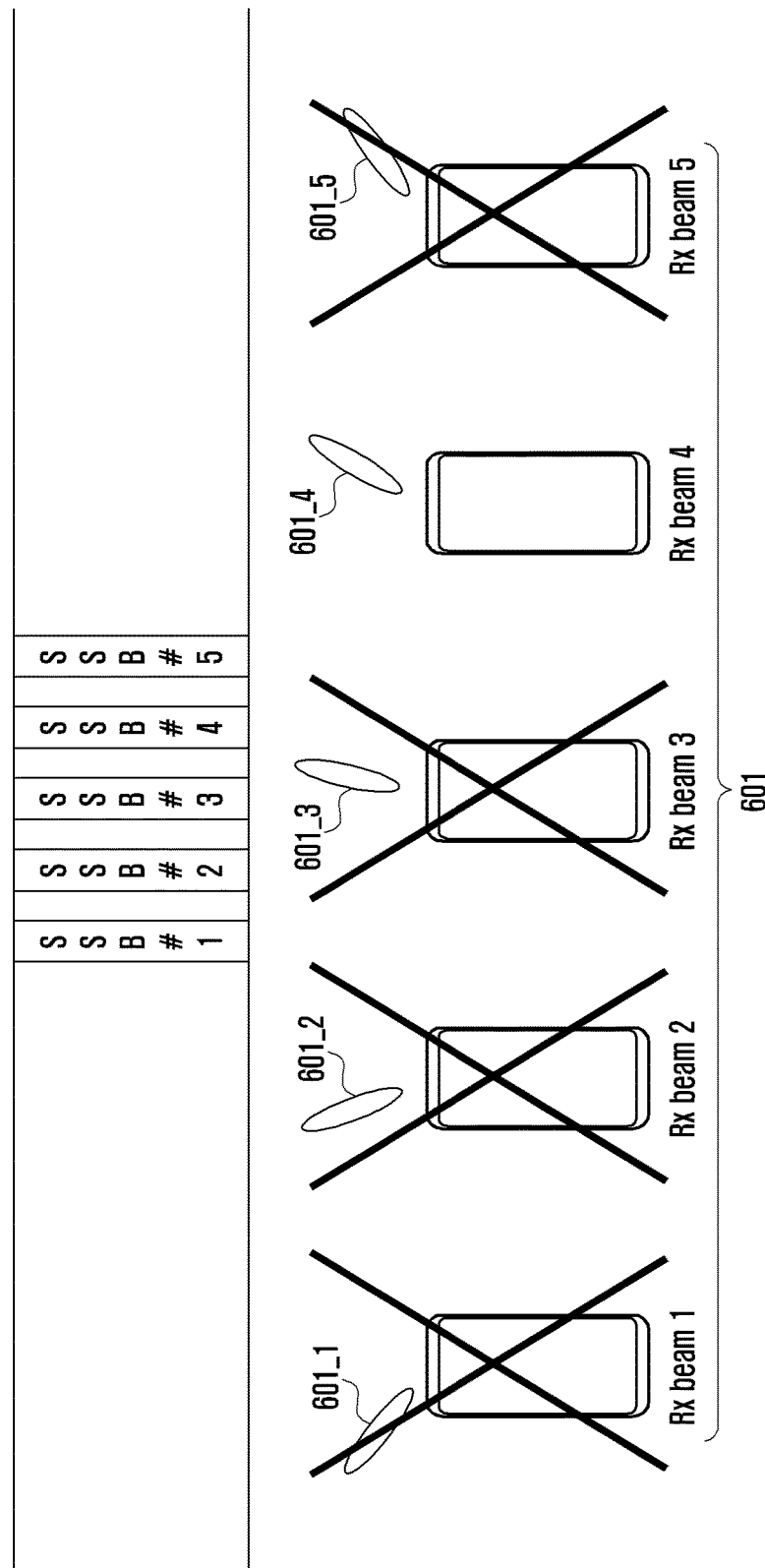
FIG. 6C is a diagram illustrating a method for reducing the number of beam searches in a beam sweeping process, according to an embodiment.

FIGS. 6A to 6C are diagrams illustrating a method for reducing the number of beam searches in a beam sweeping process, according to various embodiments.

Referring to FIG. 6A, in the next generation mobile communication system (e.g., 5G new radio (NR)), at least one external electronic device (e.g., a first base station 611, a second base station 612, and/or a third base station 613) may transmit an SSB. Hereinafter, the at least one external electronic device will be described as the first base station 611, but is not limited to the first base station 611 (i.e., the at least one external electronic device may refer to the second base station 612 and/or the third base station 613).

The first base station 611 may transmit the SSB corresponding to at least one direction (or Tx beam). Although FIG. 6A shows that each base station transmits the SSB by using Tx beams 611_1, 611_2, 611_3, 611_4, and 611_5 respectively corresponding to five directions, this is only an example and not to be construed as a limitation. The first base station 611 may transmit the SSB by using the Tx beam, based on a default direction, in order to adjust the timing according to transmission/reception of signals at an electronic device 601.

Referring to FIG. 6A, the electronic device 601 may generate a plurality of Rx beams 601_1, 601_2, 601_3, 601_4, and 601_5 by using an antenna module 197, and may transmit the generated Rx beams. In order to search for the optimal beam pair, the electronic device 601 may measure the strength of signals (e.g., RSRP of the SSB) corresponding to the Tx beams 611_1, 611_2, 611_3, 611_4, and 611_5 while fixing a first Rx beam 601_1 corresponding to a first direction. After measuring the signal strength based on the first Rx beam 601_1, the electronic device 601 may measure the strength of signals corresponding to the Tx beams 611_1, 611_2, 611_3, 611_4, and 611_5 while fixing a second Rx beam 601_2 corresponding to a second direction. Through such a measurement operation, the electronic device 601 may measure the signal strength (e.g., RSRP of SSB) by "the number of Tx beams*the number of Rx beams" with respect to one base station. The electronic device 601 may set the number of searches to find the optimal beam pair and, based on the set number of searches, measure the signal strength (e.g., RSRP of SSB). As the number of searches increases, the electronic device 101 consumes a large amount of current. This may increase a search time and also lower a processing speed.

Based on the measured signal strength, the electronic device 601 may reduce the number of searches to find the beam pair. Two methods, such as a first method and a second method, for reducing the number of searches will be disclosed. These methods are only examples and additional methods are possible. For example, in order to reduce the number of times of searching for the beam pair, the first method may sequentially reduce the number of Rx beams, and the second method may apply an infinite impulse response (IIR) filter.

FIGS. 6A to 6C show operations of reducing the number of searches to find the beam pair, based on five Tx beams 611_1, 611_2, 611_3, 611_4, and 611_5, and five Rx beams 601_1, 601_2, 601_3, 601_4, and 601_5. For example, based on five Tx beams 611_1, 611_2, 611_3, 611_4, and 611_5, and five Rx beams 601_1, 601_2, 601_3, 601_4, and 601_5, the electronic device 601 may measure RSRP values (e.g., signal strength values of SSB) according to the first search attempt. Table 3 shows an example of the measured RSRP values.

TABLE 3

| | | Rx beam index | | | | |
|---|---|---|---|---|---|---|
| | | 1 | 2 | 3 | 4 | 5 |
| Tx beam index | 1 | −75 | −80 | −60 | −95 | −95 |
| | 2 | −85 | −90 | −80 | −80 | −80 |
| | 3 | −70 | −90 | −70 | −70 | −85 |
| | 4 | −90 | −80 | −80 | −65 | −90 |
| | 5 | −100 | −90 | −90 | −75 | −75 |

In Table 3, for each Rx beam index, the largest RSRP value corresponds to the optimal beam in the case of that Rx beam index. For example, in the case of the first Rx beam, the largest RSRP value (e.g., −70) is measured for the third Tx beam, so that a combination of the first Rx beam and the third Tx beam can be obtained as the optimal beam pair. Similarly, in case of the third Rx beam, the largest RSRP value (e.g., −60) is measured for the first Tx beam, so that a combination of the third Rx beam and the first Tx beam can be obtained as the optimal beam pair. As described above, the electronic device 101 may measure the largest RSRP values for the respective individual Rx beams. Then, based on the measured RSRP values, the electronic device 101 may exclude at least one Rx beam. For example, the first search attempt may be performed for five Rx beams, the second search attempt may be performed for three Rx beams, and the third search attempt may be performed for one Rx beam. That is, the electronic device 101 may perform some search attempts while reducing the number of Rx beams. As the number of Rx beams decreases, the total number of searches to find the beam pair may be reduced.

Referring to FIG. 6B, based on the measured RSRP values, the electronic device 101 may select three Rx beams (e.g., the first Rx beam, the third Rx beam, and the fourth Rx beam). Then, based on five Tx beams 611_1, 611_2, 611_3, 611_4, and 611_5, and three Rx beams 601_1, 601_3, and 601_4, the electronic device may measure the RSRP values (e.g., signal strength values of SSB) according to the second search attempt. Table 4 shows an example of the measured RSRP values.

TABLE 4

|  | | Rx beam index | | |
|---|---|---|---|---|
|  | | 1 | 3 | 4 |
| Tx beam index | 1 | −80 | −95 | −95 |
|  | 2 | −70 | −80 | −80 |
|  | 3 | −80 | −80 | −65 |
|  | 4 | −80 | −75 | −75 |
|  | 5 | −90 | −80 | −75 |

In Table 4, for each Rx beam index, the largest RSRP value corresponds to the optimal beam in the case of that Rx beam index. For example, in the case of the first Rx beam, the largest RSRP value (e.g., −70) is measured for the second Tx beam, so that a combination of the first Rx beam and the second Tx beam can be obtained as the optimal beam pair. As described above, the electronic device 101 may measure the largest RSRP values for the respective individual Rx beams. Then, based on the measured RSRP values, the electronic device 101 may select one Rx beam (e.g., the fourth Rx beam).

Referring to FIG. 6C, based on five Tx beams and one Rx beam 601_4, the electronic device 101 may measure the RSRP values (e.g., signal strength values of SSB) according to the third search attempt.

Using the above-described first method, the electronic device 601 may reduce the number of Rx beams based on the measured RSRP values and, thus reduce the number of beam searches to find the beam pair link. As the number of beam searches is reduced, the electronic device 601 can reduce the current consumption and the processing delay time.

In the case of using the second method, the electronic device 601 may apply the IIR filter and thereby reduce the number of beam searches to find the beam pair link. The second method of applying the IIR filter may be performed using the RSRP values that were measured in the past. Equation (1), for applying the IIR filter, is as follows $$F_{m,n}^{k} = (1-a)F_{m,n}^{k-1} + aM_{m,n}^{k} \qquad (1)$$

In Equation 1, $M_{m,n}^{k}$ is an RSRP value measured with the $m^{th}$ Tx beam and the $n^{th}$ Rx beam in the $k^{th}$ SSB search, and $F_{m,n}^{k}$ is an RSRP value filtered in the $k^{th}$ SSB search. In Equation (1), "a" is a weight factor that satisfies $0 \leq a \leq 1$.

For example, based on Table 4 above, the IIR filter may be applied to measure the RSRP values (e.g., signal strength values of SSB). Referring to Table 4, according to the first search attempt, the Rx beams are selected as the first Rx beam, the third Rx beam, and the fourth Rx beam. Then, using the selected Rx beams, the Tx beam may be selected.

TABLE 5

|  |  | 1st search attempt | | | 2nd search attempt | | |
|---|---|---|---|---|---|---|---|
|  |  | | | Rx beam index | | | |
|  |  | 1 | 3 | 4 | 1 | 3 | 4 |
|  |  | | | Tx beam index | | | |
|  |  | 3 | 1 | 4 | 2 | 4 | 3 |
| Weight factor (a) | 0.6 | | | | | | |
| $F_{m,n}^{k-1}$ | | −70 | −60 | −65 | −85 | −80 | −70 |
| $M_{m,n}^{k}$ | | −80 | −95 | −75 | −70 | −75 | −65 |
| $F_{m,n}^{k}$ | | −76 | −81 | −71 | −76 | −77 | −67 |

Referring to Table 5, based on the selected Rx beams, the Tx beams (e.g., the third Tx beam, the first Tx beam, and the fourth Tx beam, as provided in Table 3) having the optimal RSRP value in the first search attempt are determined, and then the Tx beams (e.g., the second Tx beam, the fourth Tx beam, and the third Tx beam, as provided in Table 4) having the optimal RSRP value in the second search attempt are determined. In the second method of applying the IIR filter, the optimal beam pair may be determined by applying a weight factor (a) based on the RSRP values in the first search attempt and the RSRP values in the second search attempt. Referring to Table 5, a combination of the fourth Rx beam and the third Tx beam having the value of $F_{m,n}^{k}$ corresponding to the maximum value (i.e., −67) is determined as the optimal beam pair.

The weight factor (a) may be determined based on information related to rotation and motion of the electronic device. When the electronic device rotates, the signal strength of the beam may be lowered. The weight factor (a) may be changed at the time point when the beam search is started. As shown below in Table 6, the weight factor (a) may be determined according to whether a search attempt (i.e., $n^{th}$) includes a rotation of the electronic device with respect to a previous search attempt (i.e., $(n-1)^{th}$).

TABLE 6

|  | $n^{th}$ search attempt (rotation of electronic device) | $n^{th}$ search attempt (no rotation of electronic device) |
|---|---|---|
| $(n-1)^{th}$ search attempt (rotation of electronic device) | a = 0.5 | a > 0.5 |
| $(n-1)^{th}$ search attempt (no rotation of electronic device) | a < 0.5 | a = 0.5 |

Additionally, the weight factor (a) may be changed depending on which search attempt has a trusted result.

According to an embodiment of the disclosure, an electronic device may include a housing, an antenna module disposed in the housing or forming a portion of the housing, and including a plurality of antenna elements, a wireless communication circuit electrically or operatively connected to the antenna module, and configured to form a directional beam by using the antenna module, a processor operatively connected to the wireless communication circuit, and a memory operatively connected to the processor, and configured to store a number of measurements and a threshold, the number of measurements being defined for measuring, by using the directional beam, a strength of a plurality of beams having different directions and generated by at least one external electronic device, and the threshold being defined for changing a beam pair link for communication with the external electronic device. The memory may store instructions that cause, when executed, the processor to measure, based on the number of measurements, strength of a first beam generated by a first external electronic device by using a first directional beam formed in a first direction through the antenna module, to measure, based on the number of measurements, a strength of a second beam generated by at least one of the first external electronic device or a second external electronic device by using a second directional beam formed in a second direction different from the first direction through the antenna module, and to adjust at least one of the stored number of measurements or the stored threshold, based on at least in part the measured strength of the first and second beams.

The antenna module may further include at least one sensor, and the instructions may cause, when executed, the processor to detect a state of the electronic device by using the at least one sensor, and to adjust at least one of the stored number of measurements or the stored threshold based on at least in part the detected state of the electronic device.

The at least one sensor may include at least one of a motion sensor or a grip sensor.

The instructions may cause, when executed, the processor to measure a variation in the strength of the first beam corresponding to the first directional beam in the first direction, based on the detected state of the electronic device, and to determine the second beam corresponding to the second directional beam in the second direction, based on at least in part a result of a comparison between the variation in the strength of the first beam and a first threshold.

The memory may store priorities of the first and second beams, and the instructions may cause, when executed, the processor to adjust the priorities of the first and second beams when the variation in the strength of the first beam exceeds the first threshold.

The instructions may cause, when executed, the processor to maintain a beam pair link for the first beam when the variation in the strength of the first beam is equal to or smaller than the first threshold.

The memory may store a plurality of first values associated with the number of measurements, a plurality of second values associated with the threshold, and mapping information between the first values and the second values.

The plurality of first values and the plurality of second values may be changed by the processor based on the detected state of the electronic device.

The instructions may cause, when executed, the processor to form a beam pair link associated with the first beam by using the first directional beam in the first direction.

The instructions may cause, when executed, the processor to form a beam pair link associated with the second beam by using the second directional beam in the second direction when the strength of the second beam exceeds the adjusted threshold.

A method for forming a beam pair link, performed by a processor of an electronic device, may include measuring strength of a first beam generated by a first external electronic device (e.g., a base station) by using a first directional beam formed in a first direction through an antenna module of the electronic device, measuring a strength of a second beam generated by at least one of the first external electronic device or a second external electronic device by using a second directional beam formed in a second direction different from the first direction through the antenna module, and adjusting at least one of a number of measurements or a threshold, based on at least in part the measured strength of the first and second beams, the number of measurements being defined for measuring beam strength, and the threshold being defined for changing a beam pair link. The measuring strengths of the first and second beams may be based on the number of measurements.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a housing;
an antenna module disposed in the housing or forming a portion of the housing, and including a plurality of antenna elements;
a wireless communication circuit electrically or operatively connected to the antenna module, and configured to form a directional beam by using the antenna module;
a processor operatively connected to the wireless communication circuit; and
a memory operatively connected to the processor, and configured to store a number of measurements and a threshold, the number of measurements being defined for measuring, by using the directional beam, a strength of a plurality of beams having different directions and generated by at least one external electronic device, and the threshold being defined for changing a beam pair link for communication with the external electronic device,
wherein the memory stores instructions that cause, when executed, the processor to:
measure, based on the number of measurements, a strength of a first beam generated by a first external electronic device by using a first directional beam formed in a first direction through the antenna module,
measure, based on the number of measurements, a strength of a second beam generated by at least one of the first external electronic device or a second external electronic device by using a second directional beam formed in a second direction different from the first direction through the antenna module, and
adjust at least one of the stored number of measurements or the stored threshold based on at least the measured strengths of the first and second beams.

2. The electronic device of claim 1, wherein the antenna module further includes at least one sensor, and wherein the instructions further cause, when executed, the processor to:
detect a state of the electronic device by using the at least one sensor, and
adjust at least one of the stored number of measurements or the stored threshold based on at least the detected state of the electronic device.

3. The electronic device of claim 2, wherein the at least one sensor includes at least one of a motion sensor or a grip sensor.

4. The electronic device of claim 2, wherein the instructions further cause, when executed, the processor to:
measure a variation in the strength of the first beam corresponding to the first directional beam in the first direction based on the detected state of the electronic device, and
determine the second beam corresponding to the second directional beam in the second direction based on at least a result of a comparison between the variation in the strength of the first beam and a first threshold.

5. The electronic device of claim 4, wherein the memory stores priorities of the first and second beams, and
wherein the instructions further cause, when executed, the processor to:
adjust the priorities of the first and second beams when the variation in the strength of the first beam exceeds the first threshold, and
maintain a beam pair link for the first beam when the variation in the strength of the first beam is equal to or smaller than the first threshold.

6. The electronic device of claim 4, wherein the instructions further cause, when executed, the processor to:
maintain a beam pair link for the first beam when the variation in the strength of the first beam is equal to or smaller than the first threshold.

7. The electronic device of claim 1, wherein the memory stores a plurality of first values associated with the number of measurements, a plurality of second values associated with the threshold, and mapping information between the first values and the second values.

8. The electronic device of claim 7, wherein the plurality of first values and the plurality of second values are changed by the processor, based on a detected state of the electronic device.

9. The electronic device of claim 1, wherein the instructions further cause, when executed, the processor to:
form a beam pair link associated with the first beam by using the first directional beam in the first direction.

10. The electronic device of claim 9, wherein the instructions further cause, when executed, the processor to:
form a beam pair link associated with the second beam by using the second directional beam in the second direction when the strength of the second beam exceeds the adjusted threshold.

11. A method for forming a beam pair link, the method comprising:
measuring a strength of a first beam generated by a first external electronic device by using a first directional beam formed in a first direction through an antenna module of an electronic device;
measuring a strength of a second beam generated by at least one of the first external electronic device or a second external electronic device by using a second directional beam formed in a second direction different from the first direction through the antenna module; and
adjusting at least one of a number of measurements or a threshold based on at least the measured strengths of the first and second beams, the number of measurements being defined for measuring beam strength, and the threshold being defined for changing a beam pair link,
wherein measuring strength of the first and second beams is performed based on the number of measurements.

12. The method of claim 11, wherein adjusting at least one of a number of measurements or a threshold includes:
detecting a state of the electronic device by using at least one sensor included in the antenna module; and
adjusting at least one of the number of measurements or the threshold based on at least the detected state of the electronic device.

13. The method of claim 12, wherein the at least one sensor includes at least one of a motion sensor or a grip sensor.

14. The method of claim 12, further comprising:
measuring a variation in the strength of the first beam corresponding to the first directional beam in the first direction based on the detected state of the electronic device; and
determining the second beam corresponding to the second directional beam in the second direction based on at least in part on a result of a comparison between the variation in the strength of the first beam and a first threshold.

15. The method of claim 14, further comprising:
adjusting priorities of the first and second beams stored in a memory of the electronic device when the variation in the strength of the first beam exceeds the first threshold.

16. The method of claim 14, further comprising:
maintaining a beam pair link for the first beam when the variation in the strength of the first beam is equal to or smaller than the first threshold.

17. The method of claim 11, wherein a plurality of first values associated with the number of measurements, a plurality of second values associated with the threshold, and mapping information between the first values and the second values are stored in a memory of the electronic device.

18. The method of claim 17, wherein the plurality of first values and the plurality of second values are changed based on a detected state of the electronic device.

19. The method of claim 11, further comprising:
forming a beam pair link associated with the first beam by using the first directional beam in the first direction.

20. The method of claim 19, further comprising:
forming a beam pair link associated with the second beam by using the second directional beam in the second direction when the strength of the second beam exceeds the adjusted threshold.

* * * * *